United States Patent [19]

Toepel

[11] Patent Number: 5,280,494
[45] Date of Patent: Jan. 18, 1994

[54] MODULAR LASER DEMONSTRATION KIT

[76] Inventor: Michael P. Toepel, 4 Depot St., Pittsfield, N.H. 03263

[21] Appl. No.: 688

[22] Filed: Jan. 5, 1993

[51] Int. Cl.$^5$ ............................................. H01S 3/08
[52] U.S. Cl. ......................................... 372/92; 372/107
[58] Field of Search ..................... 372/35, 41, 92, 107

[56] References Cited

U.S. PATENT DOCUMENTS

| | | | |
|---|---|---|---|
| 4,709,372 | 11/1987 | Rando et al. | 372/93 |
| 4,891,820 | 1/1990 | Rando et al. | 372/107 |
| 4,897,851 | 1/1990 | Vecht et al. | 372/107 |

*Primary Examiner*—Rodney B. Bovernick
*Assistant Examiner*—Robert E. Wise
*Attorney, Agent, or Firm*—James T. Sullivan

[57] ABSTRACT

A modular laser demonstration apparatus is taught by this invention and is made up of two modular assemblies, an optical resonator and a laser pump module. The optical resonator comprises a separation means and front and rear reflector assemblies. Each of the reflector assemblies has a first adjustable attachment means to adjustably attach at least one mirror selected from a set of interchangeable mirrors to its respective reflector assembly and a second attachment means comprising a plurality of clamp means to slidably mount the reflector assembly to the separation means in a manner that confines the sliding motion to a single plane along the axis of the separation means. Furthermore, the front reflector assembly has a laser beam penetration opening to allow a laser beam generated by the modular laser demonstration apparatus to exit the apparatus for use in laser demonstrations, experiments and the like. The laser pump module comprises a removable cavity module and a non-electrically conductive cavity module cradle. The removable cavity module comprising a lamp selected from a set of interchangeable lamps, a lase material rod selected from a set of interchangeable lase material rods, a modular optical coupler selected from a set of interchangeable optical couplers, each optical coupler of said set having an optical coupling face and an outer peripheral shape. The outer peripheral shape being the same among all optical couplers to ensure interchangeability.

14 Claims, 7 Drawing Sheets

FIG. 20

MODULAR LASER DEMONSTRATION KIT

BACKGROUND OF THE INVENTION

The present invention relates to a novel apparatus for demonstrating the construction and operation of a laser and the effects of varying the component parts thereof.

SETTING OF THE INVENTION

Understanding laser operation is of great importance. Few developments have had more impact on as many different technical fields as the laser. Lasers are used for a myriad of purposes, ranging from the practical to the sublime. Lasers used in the medical field are saving lives and improving the quality of life for people every day. Lasers are also used in the fields of research, engineering, industry, communications, business, and by the military.

While lasers have many complex and specialized uses, until now, there has not been an apparatus that can be used to demonstrate the construction and operation of a laser in an educational environment that is at once, simple to use, safe, and relatively inexpensive to manufacture.

The present invention fulfills the need for such a simple, safe, and inexpensive laser demonstration apparatus through the use of a set of modular and interchangeable components. The modular components facilitate rapid assembly and disassembly of the apparatus, allow for the selection and assembly of different components resulting in a variety of differing configurations of the apparatus to be used in a plurality of different laser experiments and demonstrations. Additionally, the modular nature of the components, and in particular the consistency of their cooperation dimensions eliminates the need for time consuming laser resonator alignment. This is particularly important in an educational environment where fixed laboratory tables are often unavailable and where limited space considerations do not allow such an apparatus to be assembled and to remain in such a state for an extended period of time. In fact, in the preferred embodiment of the invention, the cooperation dimensions of the optical couplers function to form the cooling means flowpath thereby allowing for reduced machining operations in the production of the front and rear endcaps found in the removable cavity module and the costs associated therewith. Furthermore, electrical power is provided by a quick connect-/disconnect means to allow for safe and rapid assembly and disassembly of the power required for proper laser operation. Likewise, the cooling means is provided to the apparatus through the use of a novel compression seal arrangement that eliminates the need for bulky plumbing fittings.

OBJECTIVES OF THE INVENTION

Accordingly, it is an objective of the present invention to provide a modular laser demonstration apparatus in which at least some of its constituent pieces may be interchanged, thereby enabling a wide variety of laser demonstrations and experiments to be performed using the same apparatus.

Another objective of the invention is to provide a modular laser demonstration apparatus that can be rapidly assembled and disassembled and that can be used without the need for extensive and time consuming laser alignment procedures.

A further objective of the invention is to associate simplicity of construction with a minimum degree of safety for those using and observing the modular laser demonstration apparatus in operation.

Still another objective of the invention is to provide a modular laser demonstration apparatus at a low cost.

SUMMARY OF THE INVENTION

The foregoing objectives are achieved by a modular laser demonstration apparatus comprising an optical resonator and a laser pump module. The optical resonator comprises a stable separation means and front and rear reflector assemblies. Each of the reflector assemblies has a first adjustable attachment means to adjustably attach at least one mirror selected from a set of interchangeable mirrors to the reflector assembly and a second attachment means comprising a plurality of clamp means to slidably mount the reflector assembly to the separation means in a manner that confines the sliding motion to a single plane along the axis of the separation means. Furthermore, the front reflector assembly has a laser beam penetration opening to allow a laser beam generated by the modular laser demonstration apparatus to exit the apparatus for use in laser demonstrations, experiments and the like.

The laser pump module comprises a removable cavity module and a non-electrically conductive cavity module cradle. The removable cavity module comprising a lamp selected from a set of interchangeable lamps, a lase material rod selected from a set of interchangeable lase material rods, a modular optical coupler selected from a set of interchangeable optical couplers, each optical coupler of said set having an optical coupling face and an outer peripheral shape. The outer peripheral shape being the same among all optical couplers to ensure interchangeability. The cavity module also has front and rear endplates to prevent operating degradation and to increase the efficiency of the laser pump module. Each endplate has a lamp opening and a lase material rod opening to allow the lamp and lase material rod being used to pass therethrough.

The lamp, lase material rod, optical coupler and endplates all fit into combined mounting and cooling medium flow cavities in front and rear endcaps. The endcaps also have lamp and lase material rod openings to allow the lamp and lase material rod being used to pass therethrough. The mounting cavities are of dimensional equivalence to the outer peripheral shape of the optical coupler and also form, when the optical coupler is inserted, a cooling medium flowpath through which a cooling medium is passed to remove heat that is produced when the laser demonstration apparatus is in operation. The rear endcap also has a plurality of piston sealing means to seal cooling medium inlets and outlets that are located therein.

There is also an endcap compression sealing means to prevent leakage of the cooling medium that flows through the cavity module when the laser demonstration apparatus is in operation.

The non-electrically conductive cavity module cradle comprises a front cradle and a rear cradle. The front cradle has a modular cavity to cooperate with the front endcap in a single orientation, a means to electrically connect the front end of the lamp to an external power supply, and a slidable mounting means to slidably mount the front cradle to the optical resonator.

The rear cradle has a modular cavity to cooperate with the rear endcap in a single orientation, a means to electrically connect the rear end of the lamp to an external power supply, a means to connect a cooling medium to said rear endcap, a slidable mounting means to slidably mount said rear cradle to said optical resonator module, and an interlock to prevent operation of the laser demonstration apparatus until the entire apparatus is assembled.

BRIEF DESCRIPTION OF THE DRAWINGS

FIG. 10-A is an exploded perspective view of one cooling means flowtube sealing means shown in FIG. 10.

DETAILED DESCRIPTION OF THE INVENTION

Figure 1:
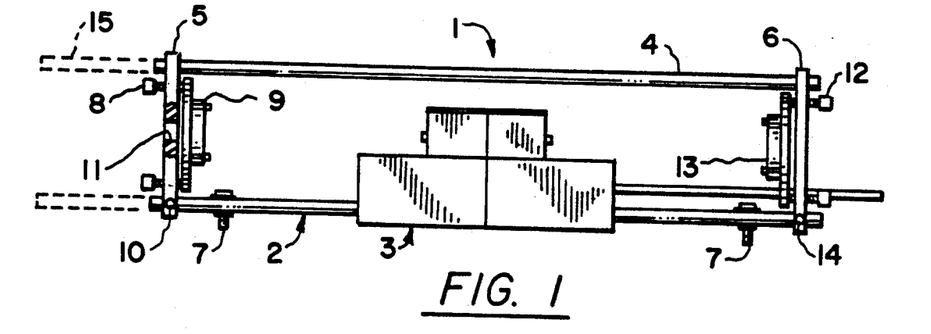
FIG. 1 is a side elevation view of one embodiment of a modular laser demonstration apparatus constructed in accordance with the teaching of the invention.
Figure 2:
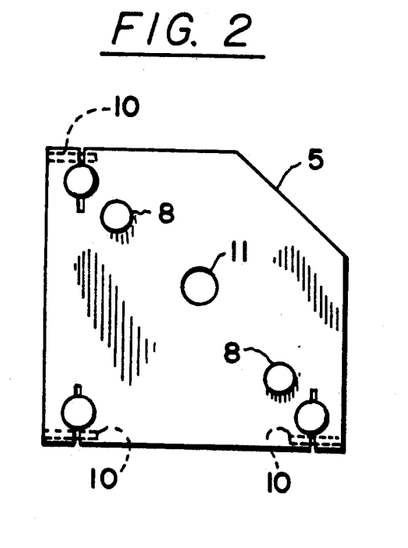
FIG. 2 is a front end elevation view of the front reflector assembly shown in FIG. 1.
Figure 3:
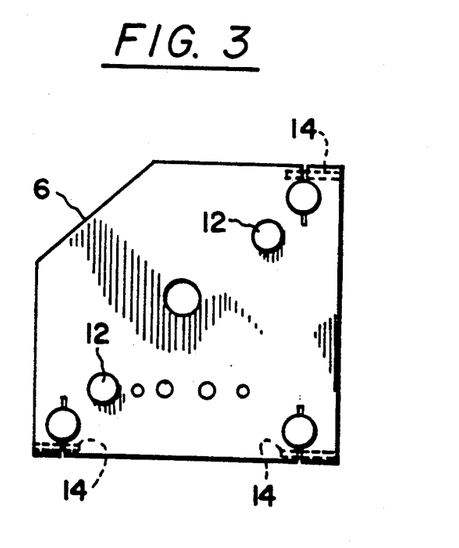
FIG. 3 is a rear end elevation view of the rear reflector assembly shown in FIG. 1.

Referring now to FIGS. 1, 2, and 3, a modular laser demonstration apparatus constructed in accordance with the present teaching is shown and is generally designated as 1. The modular laser demonstration apparatus 1 is made up of two modular assemblies, the optical resonator 2, the laser pump module 3.

The optical resonator comprises a separation means 4, a front reflector assembly 5, a rear reflector assembly 6 and an optional mounting means 7. The separation means comprises a plurality of parallel rods or the like that are fabricated from a temperature stable material, preferably INVAR to assure consistency of resonator length irregardless of the ambient temperature.

The front reflector assembly has two adjustable assembly attachment means, the first being an adjustable front mirror attachment means 8 to adjustably attach at least one front mirror 9 selected from a set of interchangeable mirrors to the front reflector assembly 5. The front mirror 9 may be planar but will usually be spherical so that the laser light generated by the laser pump module is focused slightly into the lasing material. The front mirror is also usually coated for partial reflection to permit transmission of the laser light generated by the apparatus for use in demonstrations and experiments outside of the optical resonator.

The second adjustable attachment means 10, which comprises a plurality of clamp means, serves to slidably mount the front reflector assembly 5 to the separation means 4 in a manner that confines the sliding motion to a single plane along the axis of the separation means 4. This feature is particularly important in educational environments where class time constraints do not allow for time consuming laser alignment. Since the desired length of the apparatus will depend on the wavelength of the laser light generated by the lase material being used in the apparatus, this feature, in particular, facilitates the use of a single apparatus in a variety of different laser demonstrations and experiments. The front reflector assembly 5 also has a laser beam penetration opening 11 to allow the laser beam generated by the apparatus to exit the apparatus for use in laser demonstrations, experiments and the like.

Likewise, the rear reflector assembly 6 has two adjustable assembly attachment means. The first being an adjustable rear mirror attachment means 12 to adjustably attach a rear mirror 13 selected from the set of interchangeable mirrors to the rear reflector assembly. The rear mirror will usually be coated for maximum reflectivity at the operating wavelength of the lase material that is being used by the apparatus. The second adjustable attachment means 14 serves to slidably mount the rear reflector assembly 6 to the separation means 4 in the same manner employed by the front reflector assembly 5, thereby again confining the sliding motion to a single plane along the axis of the separation means 4. Extensions 15 for mounting additional modules for use with experiments may be removably attached to the front end of the separation means. Additional modules may also be mounted on the separation means of the resonator between the front and rear reflector assemblies.

With reference to FIGS. 4 through 8, the laser pump module comprises a removable cavity module 16 and a cradle module 17. The removable cavity module 16 comprises a lamp 18, a lase material rod 19, modular optical coupling means 20 and 21, front and rear endplates 22 and 23, and front and rear endcaps 24 and 25. The lamp 18 is selected from a set of interchangeable lamps and provides the optical energy required to excite the lase material rod. The lase material rod 19 is selected from a set of interchangeable lase material rods. The modular optical coupling means 20 and 21 are also selected from a set of interchangeable optical coupling means.

The modular optical coupling means comprises a first coupler half 20 and a second coupler half 21. Each lamp coupler half of said optical coupling means has an optical coupling face 26 and an outer peripheral shape 27. The optical coupling face 26 optically couples the lamp and the lase material rod by directing the lamp discharge into the lase material rod. The optical coupling faces of the first and second lamp coupler halves thus operate in unison to reflect the lamp discharge and can be made of a number of reflective materials, such as polished metals or substrates coated with metallic layers. The reflective surfaces may be dispersive rather than highly polished. Such surfaces include polished silver, gold, aluminum, and the like as well as diffuse silver, gold or aluminum, as well as other materials. The optical coupling faces may be of various geometries to couple the lamp with the lasing material. All of the modular optical couplers in the set have substantially the same outer peripheral shapes 27 to ensure interchangeability.

Figure 5:
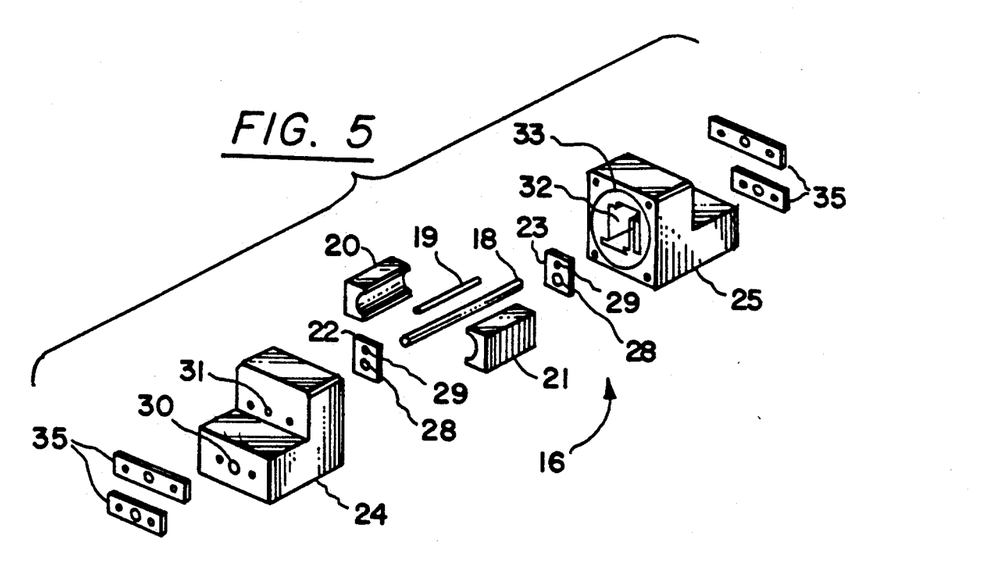
FIG. 5 is an exploded perspective view of the laser cavity module shown in FIG. 4.

The front and rear endplates 22 and 23 prevent operating degradation and increase efficiency of the laser pump module. Each endplate has a lamp opening 28 and a lase material rod opening 29 to allow the ends of the lamp and the lase material rod to respectively pass therethough.

Figure 4:
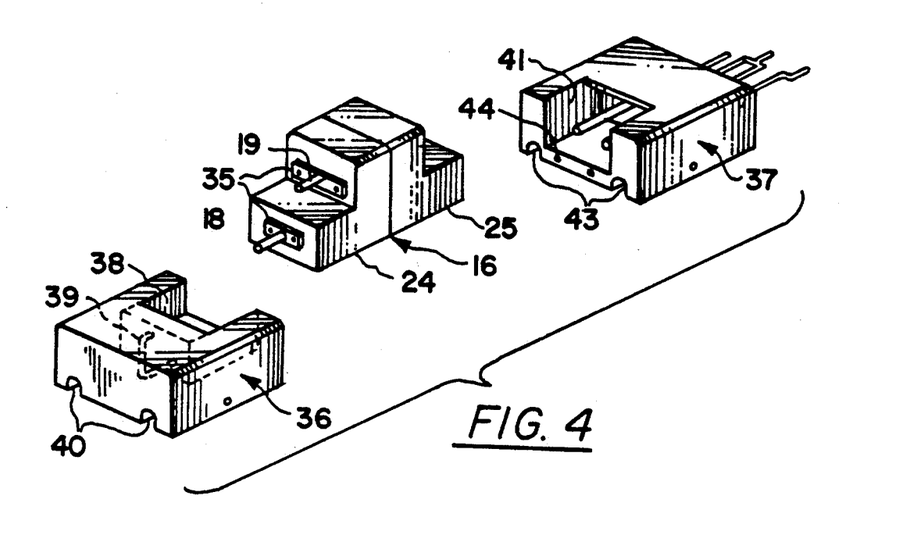
FIG. 4 is an exploded perspective view of the laser pump module assembly shown in FIG. 1.

Each endcap has a combined mounting and cooling medium flowpath cavity 32 into which the optical coupling means is inserted. When the optical coupling means is inserted into the cavity, a cooling medium flowpath is formed to allow a cooling medium to be circulated through the cavity module to remove heat that is generated within the module when the modular laser demonstration apparatus 1 is in operation. The dimensions of each cavity are of dimensional equivalence to the outer peripheral shape of the lamp couplers to facilitate interchangeability and ease of assembly. Each endcap also has a lamp opening 30 and a lase material rod opening 31 through which the lamp and lase material rod penetrate when the removable cavity module is assembled as shown in FIG. 4.

When the cavity module is assembled an endcap compression sealing means 33 is compressed by fastening means 34 to prevent leakage of the cooling medium from the removable cavity module. Additionally, the front and rear ends of the lamp and the lase material rod are sealed where they penetrate the front and rear endcaps respectively using compression seal plates 35.

Figure 6:
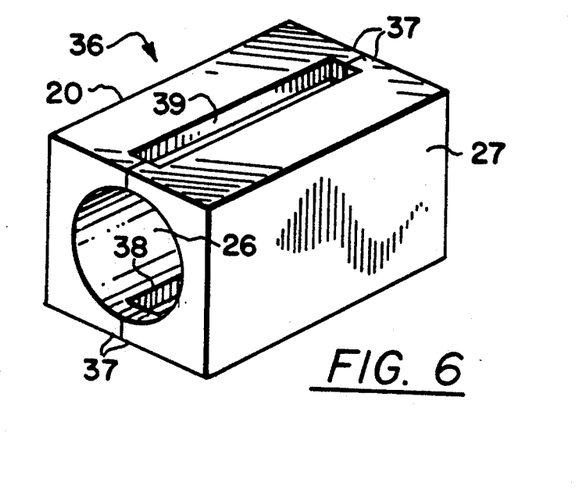
FIG. 6 is a perspective view of the modular optical coupling means shown in FIG. 5.
Figure 7:
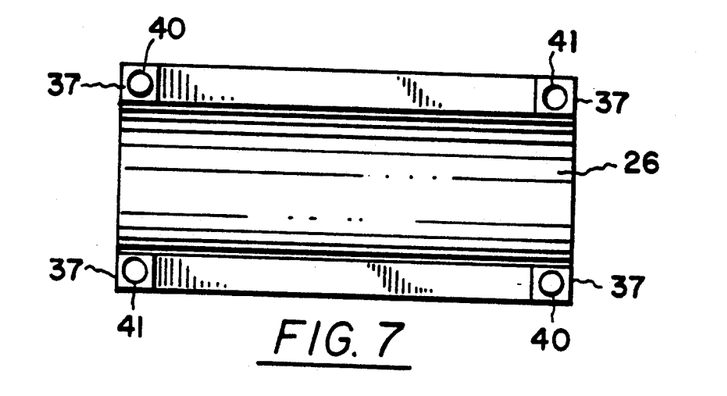
FIG. 7 is a side elevation of one optical coupler shown in FIG. 6.
Figure 8:
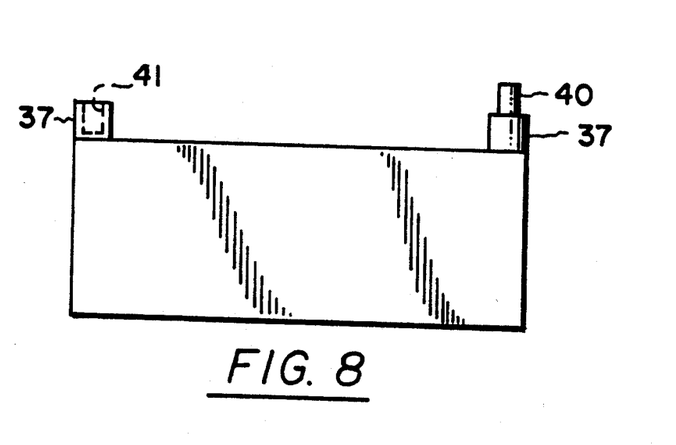
FIG. 8 is a top view of one optical coupler shown in FIG. 6.
Figure 9:
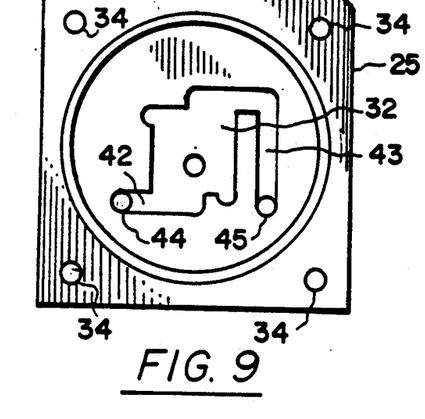
FIG. 9 is a front end elevation of the rear endcap shown in FIG. 5.

The modular optical coupling means 36 is shown in greater detail in FIGS. 6 through 8. The first optical coupler halve 20 has a plurality of mating means 37 that cooperate with like mating means on the second optical coupler half 21. When the two optical coupler halves are mated as shown in FIG. 6, a generally rectangular optical coupling means 36 is formed, the peripheral dimensions of which are of like but slightly smaller than the dimensions of the mounting cavity 32 of FIG. 5. The mating means 37 mate with each other in a manner that creates a cooling medium inlet flowslot 38 and a cooling medium outlet flowslot 39. Said mating means 37 may further comprise a plurality of pins 40 and holes 41 each of said pins 40 of the mating means 37 of said first optical coupler half cooperating with a hole 41 in the respective mating means 37 of said second optical coupler half when said halves are mated to form the optical coupling means 36.

Turning now to FIGS. 9 through 14, when the modular optical coupling means 36 is inserted into the mounting cavity 32, the cooling medium inlet flowslot 38 lines up with a cooling medium inlet flowchannel 42. A cooling medium is supplied to the inlet flow channel through a cooling medium inlet 44. The cooling medium inlet 44 comprises a plurality of reduced diameter inlet bores through the rear endcap 25. An outer inlet bore 46, being of the largest diameter is located at the rear end of the rear endcap and leads to a reduced diameter intermediate inlet bore 48, the diameter of which is of like but slightly smaller diameter than the cooling medium inlet flowtube 52. The intermediate inlet bore then leads to an inner inlet bore 50 of yet a smaller diameter than the diameter of the intermediate inlet bore 48. This configuration thus allows the cooling medium inlet flowtube 52 to be removably inserted into the rear endcap where it will come to rest at the inlet to the inner inlet bore 50.

A like arrangement is used for the cooling medium outlet, wherein the cooling medium exits the modular optical coupling means 36 through cooling medium exit flowslot 39, passes through cooling medium outlet flowchannel 43, which directs the flow of the cooling medium to a cooling medium outlet 45, said cooling medium outlet comprising a plurality of reduced diameter bores through the rear endcap 25. An inner outlet bore 47 is of the smallest diameter of the outlet bores and cooperates with the cooling medium outlet flowchannel 43. This bore then leads to an intermediate outlet bore 49 whose diameter is of like but slightly smaller diameter than the cooling medium outlet flowtube 53. The intermediate bore then leads to an outer outlet bore 51 of yet a larger diameter than the diameter of the intermediate outlet bore 49. As with the cooling medium inlet, this configuration allows the cooling medium outlet flowtube 53 to be removably inserted into the rear endcap where it will come to rest at the outlet of the inner outlet bore 47.

Figure 10:
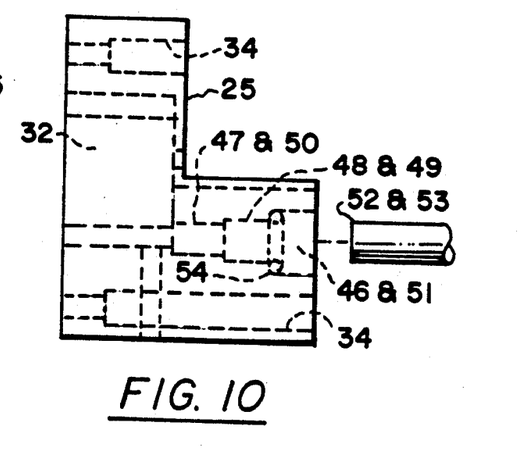
FIG. 10 is a side elevation of the rear endcap shown in FIG. 5.
Figure 10A:
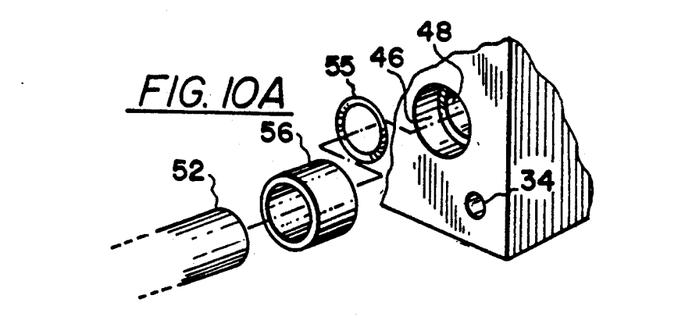
Figure 11:
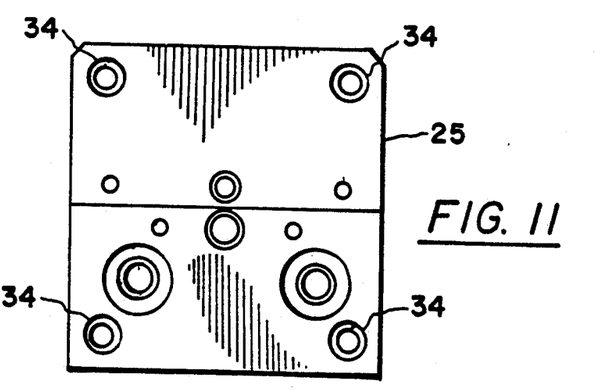
FIG. 11 is a rear end elevation of the rear endcap shown in FIG. 5.
Figure 12:
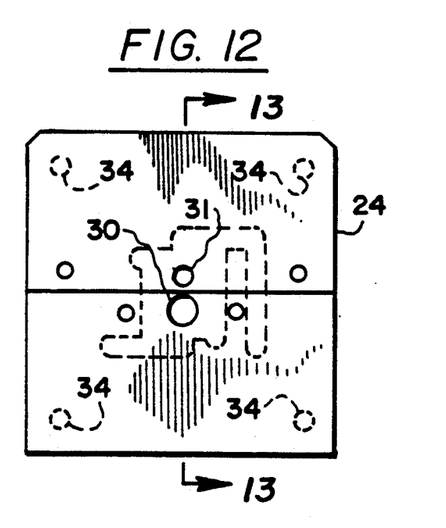
FIG. 12 is a front end elevation of the front endcap shown in FIG. 5.
Figure 13:
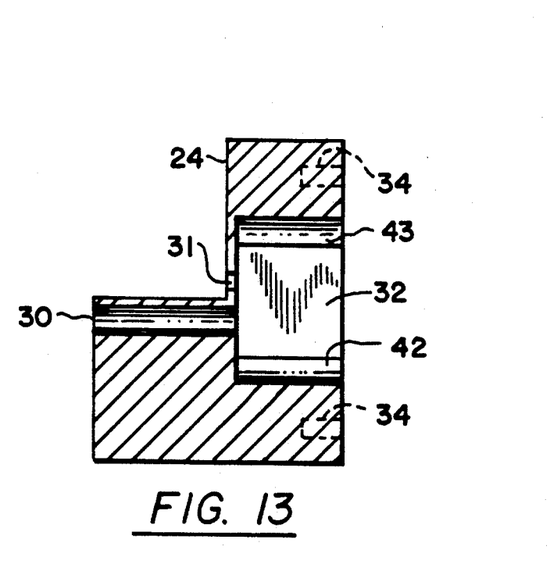
FIG. 13 is a side section view of the rear endcap shown in FIG. 12.
Figure 14:
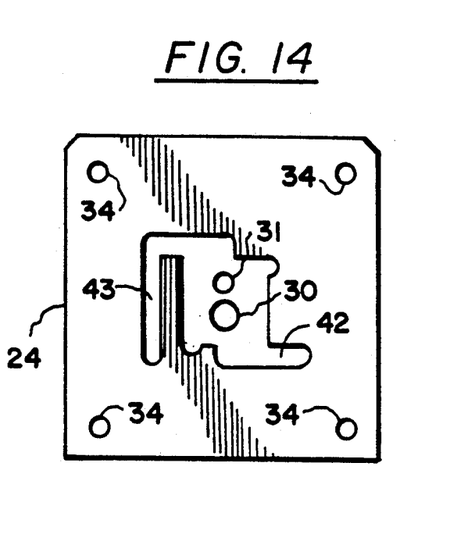
FIG. 14 is a rear end elevation of the rear endcap shown in FIG. 5.
Figure 15:
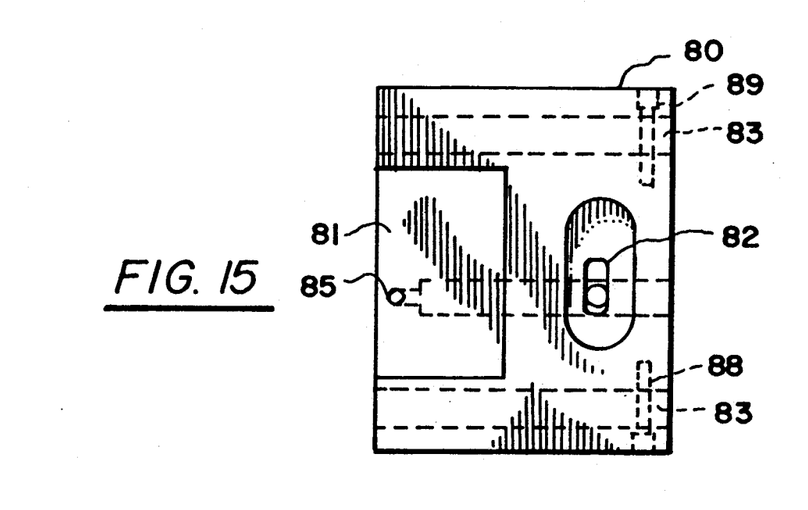
FIG. 15 is a top view of the rear cradle shown in FIG. 4.
Figure 16:
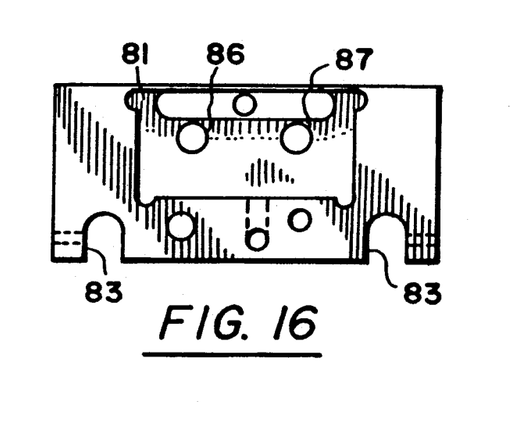
FIG. 16 is a front end elevation of the rear cradle shown in FIG. 4.
Figure 17:
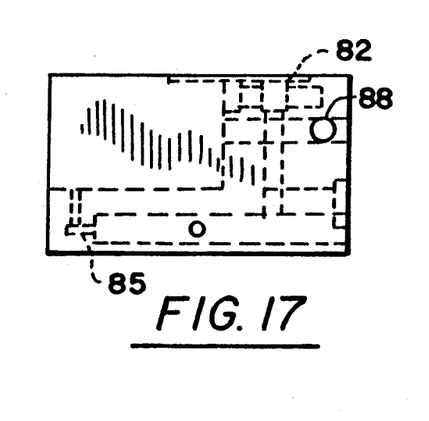
FIG. 17 is a side elevation of the rear cradle shown in FIG. 4.
Figure 18:
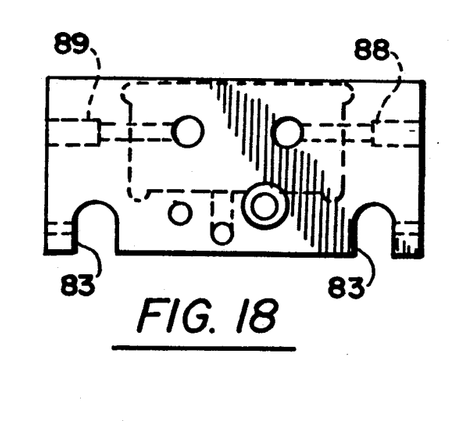
FIG. 18 is a rear end elevation of the rear cradle shown in FIG. 4.
Figure 19:
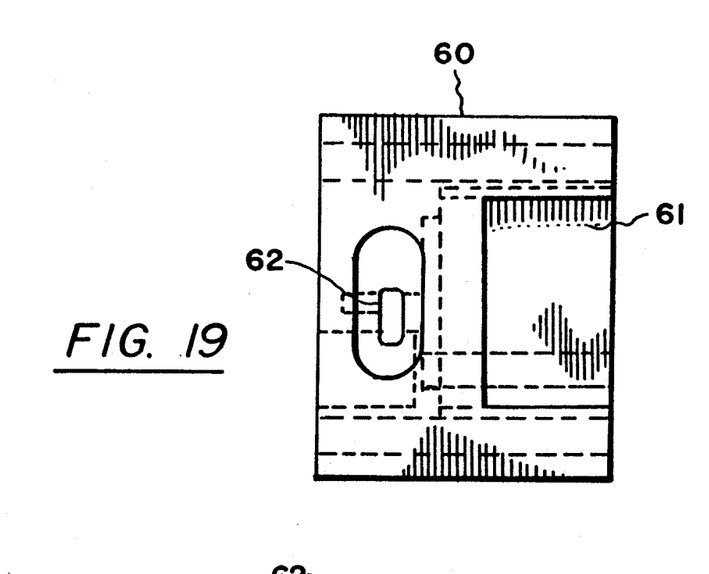
FIG. 19 is a top view of the front cradle shown in FIG. 4.
Figure 20:
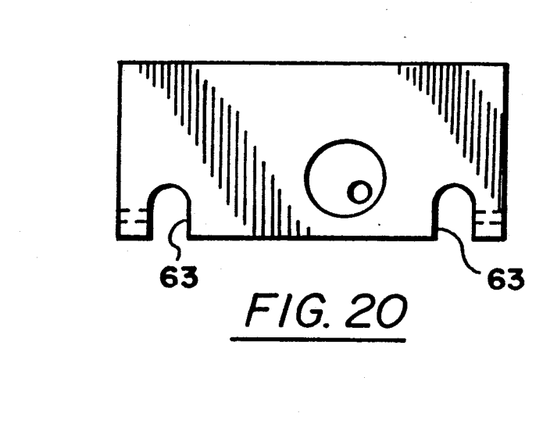
FIG. 20 is a front end elevation of the front cradle shown in FIG. 4.
Figure 21:
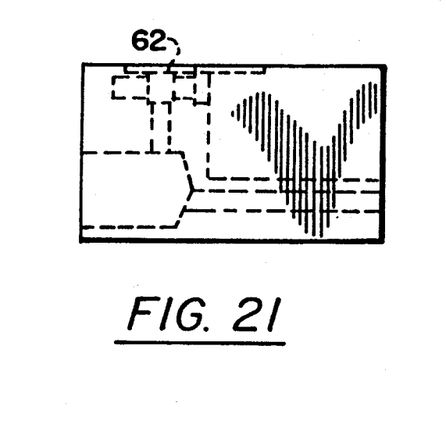
FIG. 21 is a side elevation of the front cradle shown in FIG. 4.
Figure 22:
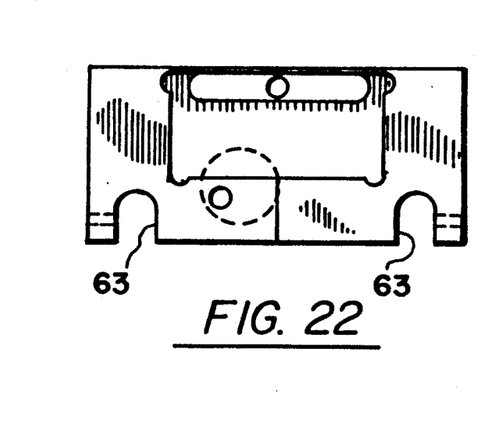
FIG. 22 is a rear end elevation of the front cradle shown in FIG. 5.

The novel sealing means is utilized to hydraulically seal both the cooling medium inlet and outlet. This arrangement can be seen in detail in FIGS. 10 and 10-A. A piston seal arrangement 54 is utilized to eliminate the need for expensive and cumbersome threaded type plumbing fittings. A sealing means 55, which is preferably a standard "O-Ring" with an outer diameter of substantially the same diameter as the cooling medium outer inlet and outlet bores 46 and 51 respectively is inserted into each outer bore. The inner diameter of the "O-Ring" is preferably of slightly smaller diameter than the cooling medium inlet and outlet flowtubes 52 and 53. A spacer 56 is inserted next, said spacer having an outer diameter of substantially the same diameter as the diameter of the outer bore into which it is inserted. The spacer 56 has an inner diameter that is preferably tapered from a diameter that is larger than the diameter of the cooling medium flowtubes at its outer end to allow for ease of insertion of the flowtubes and is reduced to a diameter that is of like yet slightly smaller diameter than the cooling medium flowtubes at its inner end where it rests against the o-ring. Thus, when each flowtube is inserted into its respective endcap opening, it forces the o-ring to expand and seal the endcap thereby preventing cooling medium leakage.

The cavity module cradle 17 comprises a front cradle 60 and a rear cradle 80. The front and rear cradles are fabricated from a non-electrically conductive material such as lexan or the like, which provides an added margin of safety when the modular laser demonstration apparatus is in operation.

The front cradle 60 has a modular cavity 61 to cooperate with the front endcap 24 in a single orientation, a power connection means 62 to electrically connect the front connector of the lamp 18 to an external power supply and a slidable mounting means 63 to allow said front cradle to be slidably mounted to the separation means of the optical resonator to facilitate rapid assembly and disassembly.

The rear cradle 80 has a modular cavity 81 to cooperate with the rear endcap 25 in a single orientation, a power connection means 82 to electrically connect the rear connector of the lamp 18 to an external power supply and a slidable mounting means 83 to slidably mount said rear cradle to the separation means of the optical resonator. The rear cradle also has an interlock 84 to shut off the power supply and cooling medium flow if the entire modular laser demonstration apparatus is not completely assembled. In one embodiment of the invention, the rear cradle also comprises a parallel triggering means 85. Cooling medium inlet and outlet flowtube penetrations are shown as 86 and 87 respectively. The diameter of each of said penetrations is of like yet slightly larger diameter than the flowtubes themselves to allow the flowtubes to pass therethrough. When the flowtubes are inserted into their proper position, they will extend into the modular cavity 81 a distance equal to the distance that they will insert into the rear endcap. Once the flowtubes are in their proper position locking means 88 and 89 is used to hold them in position so that future adjustments are not required.

What is claimed is:

1. A modular laser demonstration apparatus comprising:

an optical resonator, said resonator comprising a separation means and front and rear reflector assemblies, each of said reflector assemblies having a first adjustable attachment means to adjustably attach at least one mirror selected from a set of interchangeable mirrors to said reflector assembly and a second attachment means comprising a plurality of clamp means to slidably mount said reflector assembly to said separation means in a manner that confines the sliding motion to a single plane along the axis of said separation means, said front reflector assembly further comprising a laser beam penetration opening to allow a laser beam generated by the modular laser demonstration apparatus to exit the apparatus for use in laser demonstrations, experiments and the like and a laser pump module, said pump module comprising a removable cavity module and a non-electrically conductive cavity module cradle, said removable cavity module comprising a lamp selected from a set of interchangeable lamps, each lamp of said set having a front end and a rear end, a lase material rod selected from a set of interchangeable lase material rods, each lase material rod having a front end and a rear end, a modular optical coupler selected from a set of interchangeable optical couplers, each optical coupler of said set having an optical coupling face and an outer peripheral shape, said outer peripheral shape being the same among all optical couplers, a front endplate having a front lamp opening, said front end of said lamp being insertable through said front lamp opening and a front lase material rod opening, said front end of said lase material rod being insertable through said front lase material rod opening, a rear endplate having a rear lamp opening, said rear end of said lamp being insertable through said rear lamp opening and a rear lase material rod opening, said rear end of said lase material rod being insertable through said rear lase material rod opening, a front endcap having a front lamp opening, said front end of said lamp being insertable through said front lamp opening, a front lase material rod opening, said front end of said lase material rod being insertable through said front lase material rod opening, a mounting cavity of dimensional equivalence to the outer peripheral shape of the optical coupler and a cooling medium flowpath through which a cooling medium is passed to remove heat that is produced when the laser demonstration apparatus is in operation, a rear endcap having a rear lamp opening, said rear end of said lamp being insertable through said rear lamp opening, a rear lase material rod opening, said rear end of said lase material rod being insertable through said rear lase material rod opening, a mounting cavity of dimensional equivalence to the outer peripheral shape of the lamp coupler, and a cooling medium flowpath through which a cooling medium is passed to remove heat that is produced when said laser demonstration apparatus is in operation, and a plurality of piston sealing means to seal cooling medium inlets and outlets, and an endcap compression sealing means to prevent leakage of the cooling medium that flows through the endcaps when the laser demonstration apparatus is in operation, and said cavity module cradle comprising a front cradle and a rear cradle, said front cradle having a modular cavity to cooperate with said front endcap in a single orientation, a means to electrically connect said front end of said lamp to an external power supply, and a slidable mounting means to slidably mount said front cradle to said optical resonator assembly, said rear cradle having a modular cavity to cooperate with said rear endcap in a single orientation, a means to electrically connect said rear end of said lamp to an external power supply, a means to connect a cooling medium to said rear endcap, a slidable mounting means to slidably mount said rear cradle to said optical resonator module, and an interlock to prevent operation of the laser demonstration apparatus until the entire apparatus is assembled.

2. The modular laser demonstration apparatus as claimed in claim 1 wherein said mirror attachment means comprises a plurality of adjustment screws that penetrate each reflector assembly and cooperate with each of said mirrors.

3. The modular laser demonstration apparatus as claimed in claim 1 wherein said separation means is a plurality of parallel temperature stable rods.

4. The modular laser demonstration apparatus as claimed in claim 3 wherein said temperature stable rods are INVAR rods.

5. The modular laser demonstration apparatus as claimed in claim 1 wherein said cavity module cradle is fabricated from a non-electrically conductive material.

6. The modular laser demonstration apparatus as claimed in claim 5 wherein said non-electrically conductive material is lexan.

7. The modular laser demonstration apparatus as claimed in claim 1 wherein said cooling medium flowpath comprises a cooling medium inlet quick disconnect in said rear endcap, a cooling medium inlet flowchannel disposed in said front and rear endcaps that runs the length of the optical coupler and directs the cooling medium along the entire length of the optical coupler, a cooling medium inlet flowslot to allow said cooling medium to flow into said optical coupler and around said lamp and lase material rod, a cooling medium outlet flowslot to allow said cooling medium to exit said optical coupler, a cooling medium outlet flowchannel disposed in said front and rear endcaps that runs the length of the optical coupler, and a cooling medium outlet quick disconnect in said rear endcap.

8. The modular laser demonstration apparatus as claimed in claim 7 wherein each said cooling medium quick disconnect comprises a piston sealing means.

9. The modular laser demonstration apparatus as claimed in claim 8 wherein said piston sealing means is an "o-ring."

10. The modular laser demonstration kit as claimed in claim 1 wherein said means to electrically connect the front and rear ends of said lamp are fully enclosed insulated lamp quick disconnects.

11. The modular laser demonstration kit as claimed in claim 1 wherein said slidable mounting means comprises a plurality of recessed mounting channels longitudinally disposed within said front and rear cradles having a dimension to precisely cooperate with said separation means and a plurality of lockdown means.

12. The modular laser demonstration kit as claimed in claim 11 wherein said lockdown means comprises at least one screw threaded through each cradle in a manner to cooperate with said separation means.

13. The modular laser demonstration apparatus as claimed in claim 1 wherein extensions for precision mounting additional modules for use in demonstrations, experiments and the like are removably attached to the separation means where said separation means is adjustably slidably attached to the front reflector assembly to allow a laser beam generated by said apparatus to be directed into different experiments and the like.

14. The modular laser demonstration apparatus as claimed in claim 1 wherein additional modules are removably precision mounted withing the optical resonator.

* * * * *